UNITED STATES PATENT OFFICE.

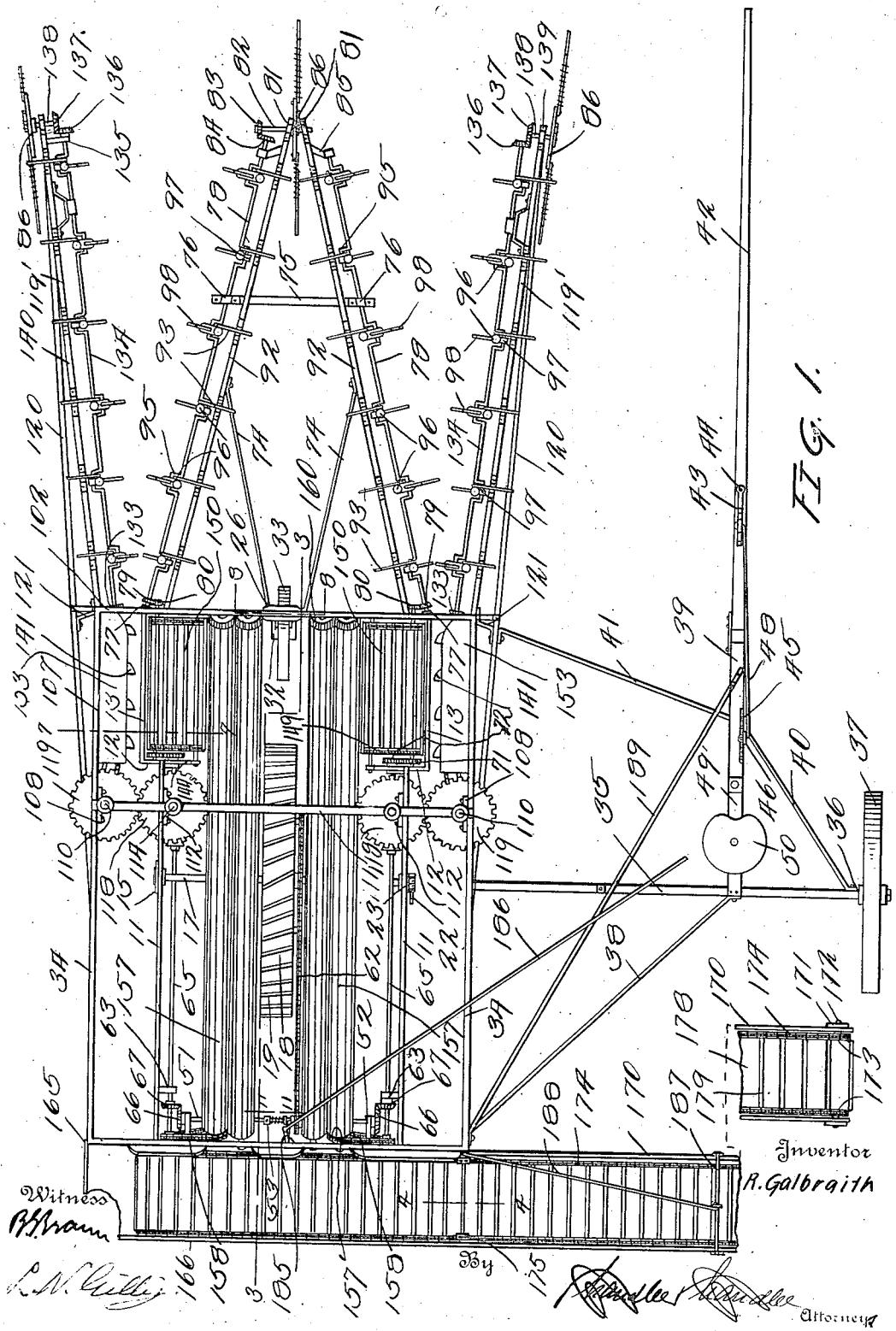

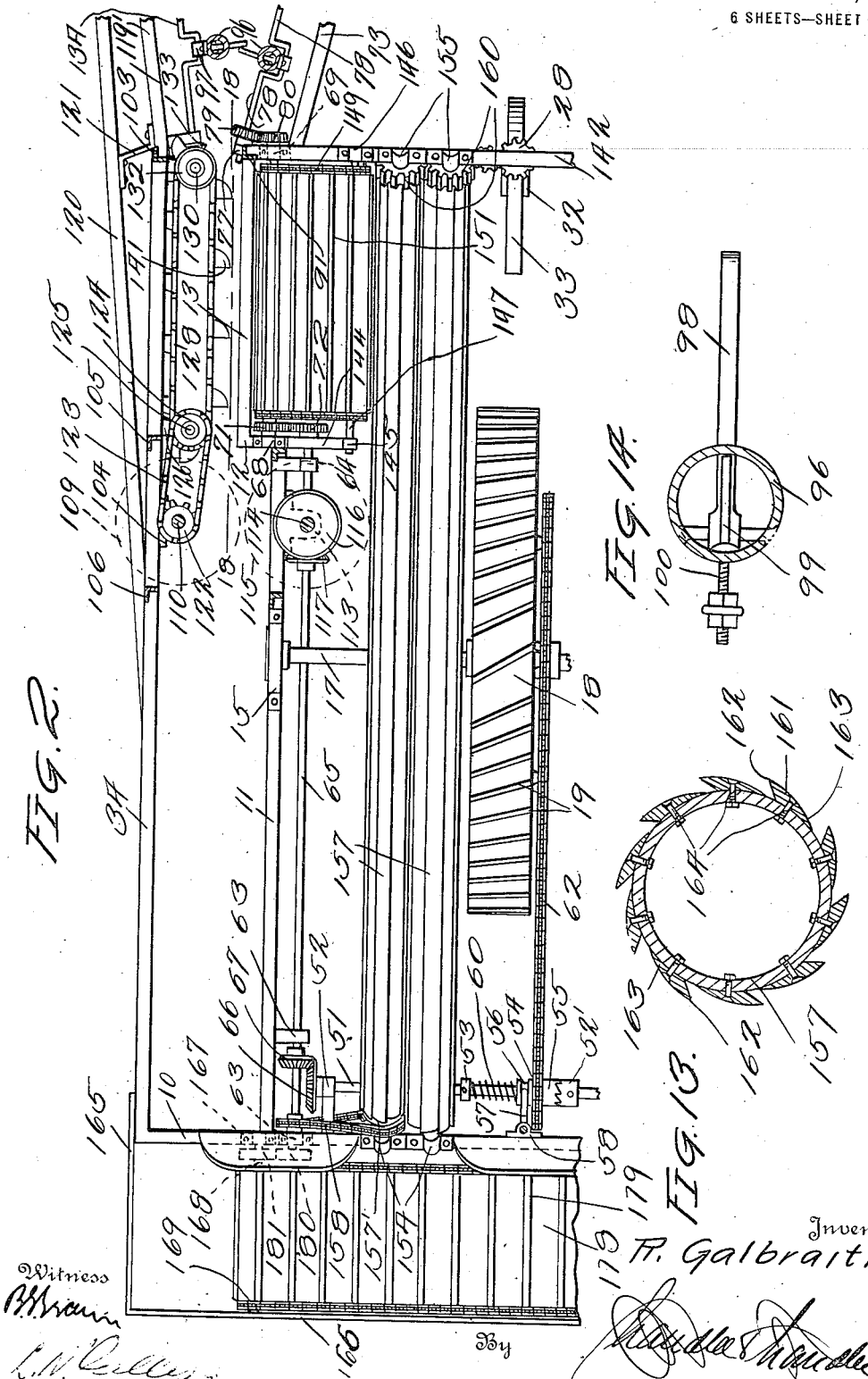

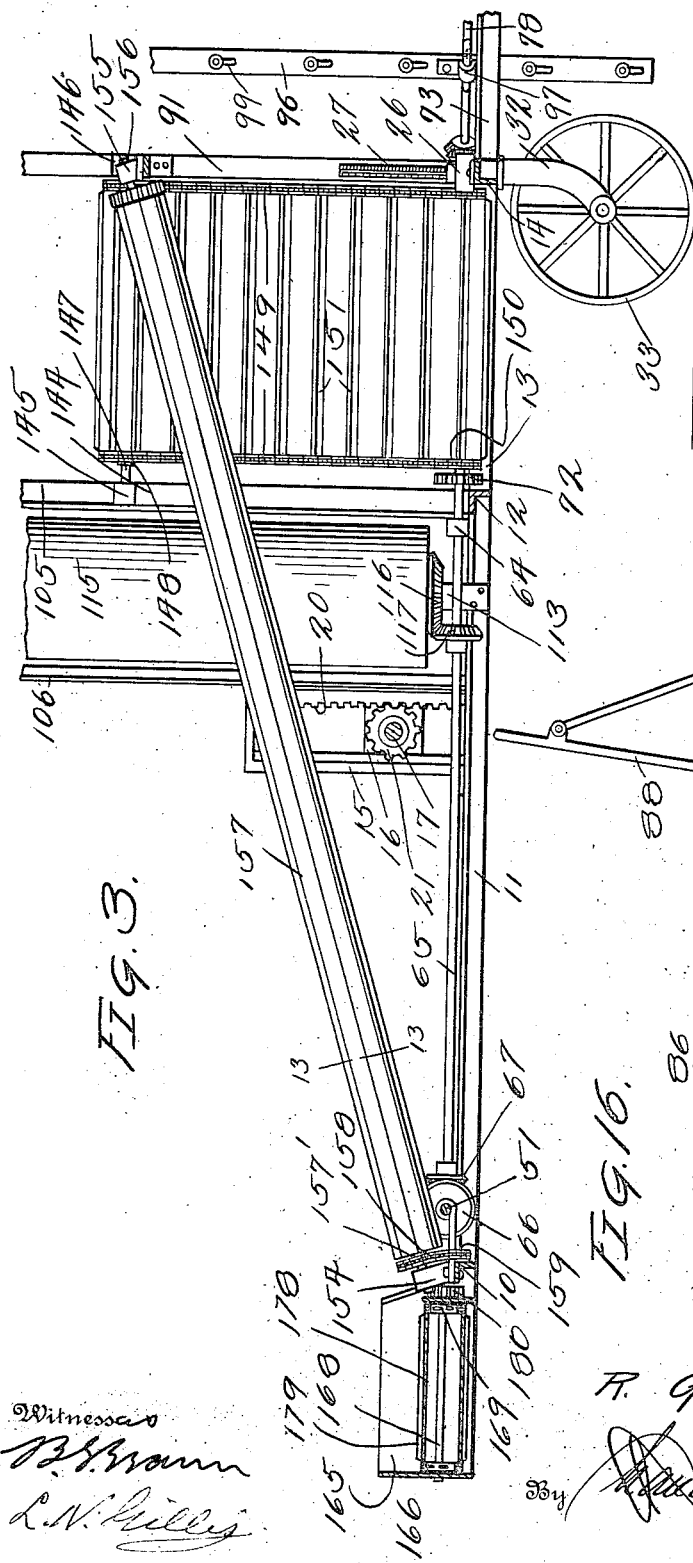
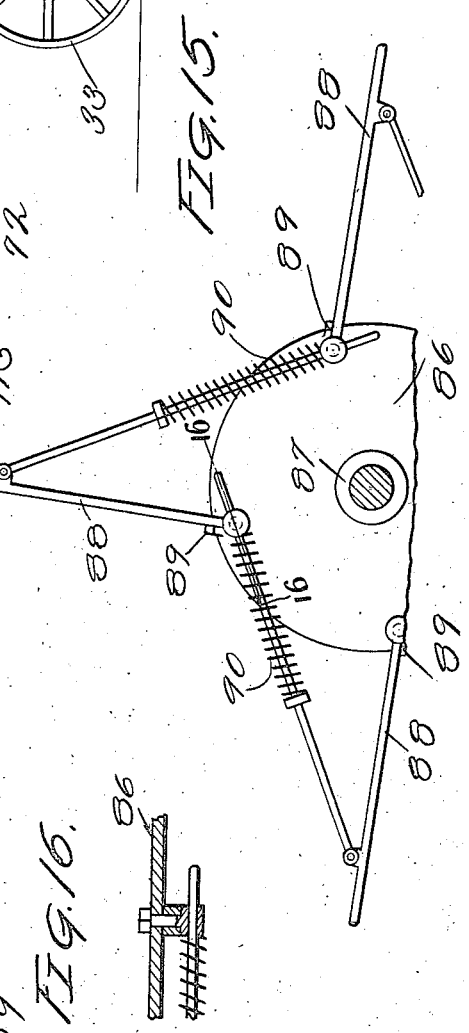

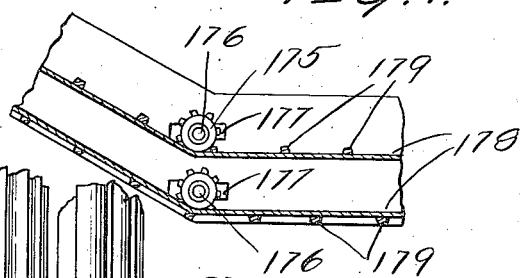
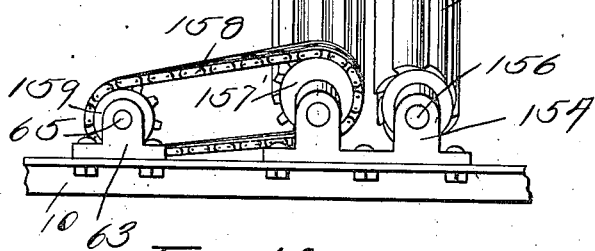
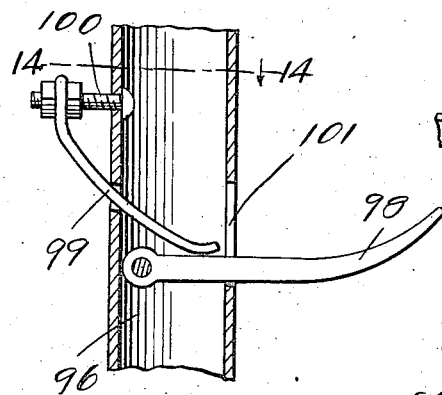
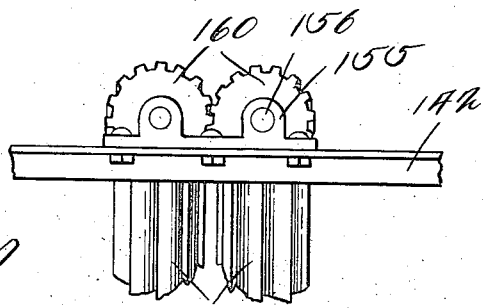
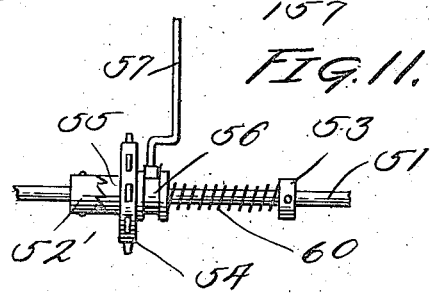

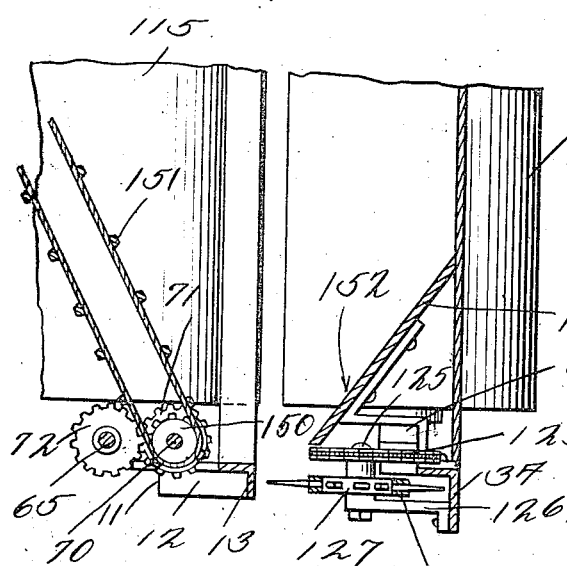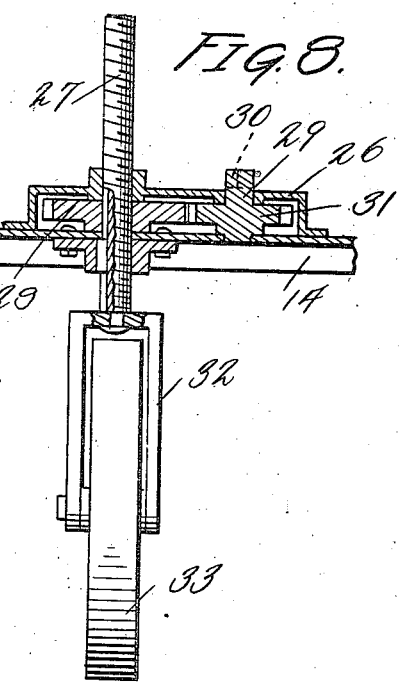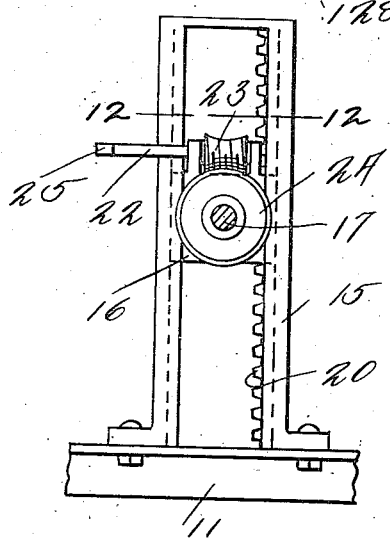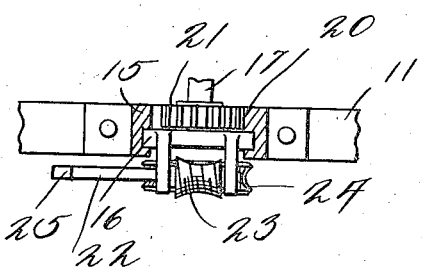

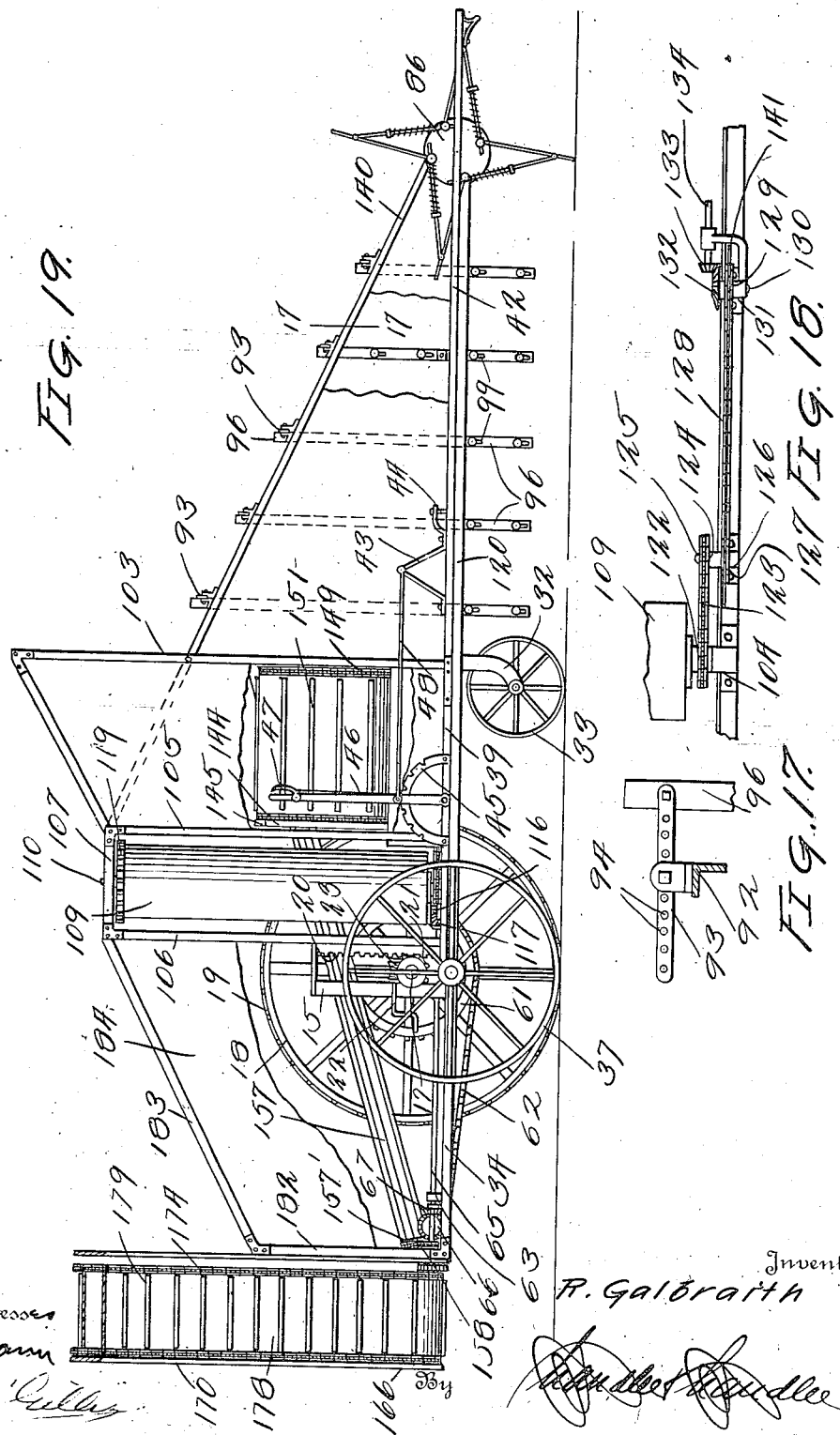

RAYMOND GALBRAITH, OF SMITHSHIRE, ILLINOIS.

TWO-ROW CORN-HARVESTER.

1,283,721.   Specification of Letters Patent.   Patented Nov. 5, 1918.

Application filed July 31, 1916. Serial No. 112,425.

*To all whom it may concern:*

Be it known that I, RAYMOND GALBRAITH, a citizen of the United States, residing at Smithshire, in the county of Warren, State of Illinois, have invented certain new and useful Improvements in Two-Row Corn-Harvesters; and I do hereby declare the following to be a full, clear, and exact description of the invention, such as will enable others skilled in the art to which it appertains to make and use the same.

This invention relates to corn harvesters and has special reference to a two row corn harvester arranged to harvest the corn from two rows at the same time, the machine being designed to harvest the standing corn, remove the ears from the stalks, and then remove the husks from the ears and deposit the husks in a suitable wagon or other receptacle.

One important object of this invention is to improve the general construction of corn harvesters of this description.

A second important object of this invention is to provide an improved means for picking up any stalks which may have been blown down.

A third important object of the invention is to provide an improved means for holding the picked up stalks in erect position.

A fourth important object of the invention is to provide an improved arrangement of snapping and husking rolls and means to convey the ears from the snap rolls to the husking rolls.

A fifth important object of the invention is to provide an improved form of lifting bar for the devices to hold the corn in erect position.

A sixth important object of the invention is to provide an improved form of husking roll.

A seventh important object of the invention is to provide improved means for regulating the vertical position of the frame with respect to the ground or driving wheels.

With the above and other objects in view, as will be hereinafter apparent the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a plan view of the entire device.

Fig. 2 is a partial plan view of the bottom frame together with certain parts associated with the lower portion of the device.

Fig. 3 is a section on the line 3—3 of Fig. 1.

Fig. 4 is a detail section on the line 4—4 of Fig. 1.

Fig. 5 is a detail section showing the drive for the husking rolls.

Fig. 6 is a detail section showing the connection between the husking rolls.

Fig. 7 is a detail section on the line 7—7 of Fig. 1.

Fig. 8 is a detail section on the line 8—8 of Fig. 1.

Fig. 9 is an enlarged detail view of one of the lifting gears.

Fig. 10 is an enlarged detail view through one of the vertically reciprocating devices for holding the stalks erect.

Fig. 11 is a detail view on the line 11—11 of Fig. 1.

Fig. 12 is a section on the line 12—12 of Fig. 9.

Fig. 13 is a section on the line 13—13 of Fig. 3.

Fig. 14 is a section on the line 14—14 of Fig. 10.

Fig. 15 is a detail view of a portion of a certain stalk lifting wheel.

Fig. 16 is a section on the line 16—16 of of Fig. 15.

Fig. 17 is a section on the line 17—17 of Fig. 19.

Fig. 18 is a section on the line 18—18 of Fig. 2.

Fig. 19 is a side elevation of the machine.

In carrying out the construction of the invention there is provided a frame consisting of a main or lower frame section and an upper frame section. These two sections are connected suitably together and the lower section is supported on certain ground wheels while the upper and lower sections serve to support the various rolls and other mechanisms connected with the device. In addition to this main frame there is provided at the rear of the machine a supplemental frame for the conveyer and elevator and a second supplemental frame at one side of the machine for connection of the draft animals.

Considering now the construction of the lower part of the frame and the parts attached thereto. The lower frame consists of a rear transverse bar 10 extending forwardly from which are the longitudinal frame members 11 hereinafter referred to as the inner longitudinal frame members. These inner longitudinal frame members are offset as at 12 to provide forwardly extending portions 13 which are spaced farther apart than the rear portions. The front ends of the members 13 are connected together by a transverse member 14, it being understood that these members, as well as all of the other frame members, may be made from any desired shape of structural steel such as angle irons, channels, bars or the like, the shape chosen being that found most advisable in the construction for the purpose desired.

Extending upward from each of the members 11 at about the middle of the distance between the members 10 and 14 there is provided a rectangular frame 15 wherein slide suitable bearing boxes 16 the frames 15 forming guides for these bearing boxes. Journaled in the boxes 16 is the main shaft or axle 17 whereon is revolubly mounted the main or bull wheel 18 provided with the usual anti-skidding and slipping ribs 19. This wheel 18 forms the principal support for the entire structure and the boxes 16 are adjustable vertically in the frames 15 so that the height of the frame can be regulated with respect to the ground. In order to effect this adjustment each of the housings or frames 15 is provided on one side with a rack 20 and on each end of the shaft 17 is fixed a gear 21 which meshes with the respective rack 20. Mounted in suitable bearings on one of the bearing boxes 16 is a worm shaft 22 whereon is a worm 23 which engages a worm wheel 24 fixed on the shaft 17. The worm shaft 22 has a polygonal end 25 engageable by an ordinary socket crank so that the shaft 22 may be turned and by its rotation cause the worm 23 to operate the wheel 24 and thus operate the gears 21 to cause them to move up or down on the racks 20.

It is to be observed that the adjustment of the main wheel 18 only raises and lowers the device bodily but does not affect its angular relation with respect to the ground. In order to provide for variation in the angular relation of the device with respect to the ground a forward supporting wheel, the front end of the device being the heavier, is utilized. This forward supporting wheel is also adjustable and the manner of effecting the adjustment of the forward supporting wheel is best seen in Fig. 8. To effect this adjustment there is provided on the front frame member 14, intermediate its ends, a bracket housing 26 and passing through this housing 26 and the front frame member is a threaded standard 27 which is splined to the frame member 14 so that it can not rotate. At the same time the openings in the frame member 14 and bracket 26 are sufficient to allow free vertical movement of such standard 27. In the bracket or housing 26 is mounted a gear wheel 28 which has a threaded central opening through which is screwed the standard 27. Thus, by the rotation of the gear wheel 28 the standard 27 is raised or lowered. Journaled in the bracket 26 is a shaft 29 which has a polygonal upper end 30 of such size as to fit the crank employed with the polygonal end 25. Fixed on the shaft 29 is a pinion 31 which meshes with the gear 28 the pinion being relatively much smaller than the gear 28 so that an increase of power can be obtained. Thus when this pinion 31 is rotated by the rotation of the shaft 29 the gear 28 will also be rotated and the standard 27 raised or lowered.

Mounted on the lower end of the standard 27 is a swiveled fork 32 wherein is supported a caster wheel 33, this wheel normally taking a portion of the weight of the front part of the machine. By means of this construction, without at all altering the general height of the machine from the ground, the position of the caster wheel 33 with reference to the machine may be varied vertically, at will, so that the front of the machine may be tipped downward or upward according to the requirements of the case and thus the entire device varied in its angular relation to the ground.

It will be seen that the two wheels 18 and 33 are in alinement and in order to keep the machine from tipping to one side or the other a third wheel is employed. Extending forwardly from the member 10 are outer longitudinal frame members 34 and projecting laterally from one of these frame members 34 is a bar 35 which has fixed thereto at its outer end a journal casting 36 whereon is revolubly mounted a ground wheel 37. It is to be noted that this ground wheel 37 is in lateral alinement with the wheel 18 and as will be seen from an inspection of Fig. 1, is on the same side as the elevator and conveyer. In order to brace the bar 35 there is connected to this bar and to the member 34 a rear brace 38 and extending forwardly from the bar 35 is a tongue member 39 braced to the bar 35 by a brace 40 and braced to one of the frame members, to be hereinafter described, by a brace 41. Hingedly connected to the forward end of the member 39 so that it may swing vertically is a tongue 42 and on this tongue is an upstanding casting 43 having its forward end spaced from the tongue, said tongue and forward end being operative to receive the bolt 44 for attaching the doubletree of the draft apparatus, the latter not being deemed necessary to be shown.

Mounted on the member 39 is a quadrant 45 and pivoted concentrically of this quadrant is a lever 46 carrying a latch 47 which works on the quadrant. This lever 46 is connected to the member 43 by the link 48 so that as the lever is moved forward and backward the front end of the tongue 42 can be raised or lowered. Also mounted on the member 39 is a standard 49' which supports a driver's seat 50, the lever 46 being located conveniently within reach of the driver on said seat.

All of the moving parts of the invention are driven by means of the wheel 18 through a main drive shaft which may be clutched to be driven by the wheel 18 or unclutched so as to remain idle while the machine is moving from one place to another. This main drive shaft is indicated at 51 and extends transversely across the frame, being supported at its ends in suitable journal boxes 52. It will be noted that this drive shaft is just in advance on the rear frame member 10. Fixed upon the shaft 51 is a toothed clutch member 52' and spaced from the clutch member 52' is a collar 53 also fixedly mounted on the shaft 51. Splined to the shaft 51 between the member 52' and collar 53 is a gear 54 having on the side adjacent the clutch member 52' a clutch member 55 adapted to coact with the clutch member 52'. On the other side of the gear 54 there is a grooved boss 56 wherein is engaged the fork of a shipper lever 57 mounted on a bracket 58 fixed to the member 10. Between the collar 53 and boss 56 there is provided a coil spring 60 which is wound around the shaft 51 and urges the wheel 54 in the direction of the fixed clutch member 52' so that when the lever 57 is released the two clutch members are thrown into engagement and the sprocket wheel 54 will revolve with the shaft.

Fixedly connected to the wheel 18 is a large sprocket 61 and the sprockets 61 and 54 are operatively connected by means of a sprocket chain 62. By this arrangement the rotation of the wheel 18 as the device is driven through the field will operate to rotate the shaft 51 unless the sprocket 54 is unclutched. If the sprocket 54 is unclutched this sprocket will revolve on the shaft 51.

On the members 11 are provided bearing boxes 63 and alined with these bearing boxes just to the rear of the portion 12 of the side frame members are other bearing boxes 64, the longitudinal shafts 65 being journaled in said boxes. On the shaft 51 are fixed bevel gears 66 which mesh with beveled gears 67 on the shafts 65. On the portions 12 of the side members and the member 14 are certain other journal boxes, those on the portion 12 being indicated at 68 and those on the member 14 being indicated at 69. In these journal boxes 68 and 69 are journaled the shafts 70 which are connected by gears 71 to gears 72 fixed on the shafts 65.

Extending forward convergently from the member 14 and connected thereto adjacent the ends thereof are the frame members 73. These members 73 are braced to the member 14 by braces 74 and have their forward ends held in proper spaced relation by a transverse frame member 75 which projects over the sides of the member 73 and carries on its outer ends the bearings 76. Mounted on the ends of the member 14 in alinement with the bearings 76, are other bearings 77 and journaled in the bearings 76 and 77 are crank shafts 78. On each of these crank shafts 78 there is provided a beveled gear 79 which meshes with a coacting bevel gear 80 fixed on the shaft 70. At the forward ends of the members 73 are mounted alined bearings 81 wherein is journaled a shaft 82 carrying on its end a beveled gear 83 which meshes with a beveled gear 84 fixed to one of the crank shafts 78. The extremity of the other crank shaft 78 is protected from injury by a combined shield and bearing 85 fixed to one of the frame members 73. On the shaft 82 is fixed one of the pick-up wheels 86 which is used to straighten up any fallen stalks of corn that may lay across the front of the machine when the latter is operated.

Each of these members 86 consists of a hub 87 which is fixedly mounted on its shaft and pivoted around the periphery of this hub is a series of arms 88 arranged to swing freely in one direction about the hub while their movement in the opposite direction is limited by means of suitable stops 89. These arms 88 are also connected to the hub by means of tension springs 90 which are so arranged as to resist the swinging movement of the arms away from their stops. The arrangement of the gearing and shafts previously described is such that the lifting wheels 86 are driven in such direction that the lowermost arms travel forwardly of the machine, in other words, the wheels 86 when viewed from the side of the machine adjacent the tongue 42 revolve in an anti-clockwise direction. The springs are so positioned that in case any of these arms strike the ground they will yield backwardly and thus prevent their breaking.

Extending upward from the extremities of the member 14 are vertical frame members 91 and extending downwardly and forwardly from the frame members 91 are frame members 92 which connect at their forward ends to the frame members 73. Pivoted to each of the frame members 92 is a series of levers 93 each of which is provided with a series of pivot bolt receiving openings 94 so that the working lengths of these levers may be regulated. The ends of these levers 94 lie over respective cranks 95 of the crank shaft 78.

Pivotally connected to the outer end of each of the levers or arms 93 are certain reciprocating lifters 96 each of which has at its lower end a bearing 97 fitting one of the cranks 95 of the respective crank shafts 78. Each of these members 96 comprises a bar having pivoted thereto a series of fingers 98 each having connected thereto an arm 99 in the form of a spring which normally presses the free end of the finger 98 downward, the spring being connected to the upright member by a suitable adjusting bolt 100. Moreover, this upright member is preferably in the form of a hollow tube with suitable slots in its sides for the springs and fingers to work through as indicated at 101 and the bottoms of these slots form stops to limit the downward movement of the fingers 98 while, upward movement of these fingers is permitted by the yielding action of the springs 99. By means of this arrangement the lower ends of the finger bars 96 travel through a circle while the upper ends thereof oscillate through arcs of circles, the radii of these arcs being determined by the lengths of the levers or arms 93. When these finger bars 96 travel downward while passing through a corn field the fingers 98 will fold upward so that no obstruction is made to the finger bars passing downward nor is the corn forced downward. However, when the finger bars travel upward the fingers 98 protrude in substantially horizontal position so that they lift the stalks of corn and comb the leaves upward.

The upper ends of the members 91 are connected by an upper transverse frame member 102 the ends of which project outward beyond the members 91. To the extremities of this member 102 are connected vertical frame members 103, the lower ends of which are connected to the forward ends of the frame members 34. On these frame members 34 are vertical bearing boxes 104 and extending upward from each of the members 34 in spaced relation to said bearing boxes 104 are vertical frame members 105 and 106, the member 105 being in front of the member 106. These members 105 and 106 are connected by upper longitudinal frame members 107 carrying bearing boxes 108 which are alined with the boxes 104. Mounted between the members 105 and 106 are the outer snapping rolls 109 which are provided with journals 110 mounted in the boxes 104 and 108. Connecting the members 107 is a transverse frame member 111. This member 111 supports vertical bearing boxes 112 and beneath these bearing boxes on the members 11 are vertical bearing boxes 113. These bearing boxes 112 and 113 receive the journals 114 of the inner snapping rolls 115. Fixed on the journals 114 at the bottom of the rolls 115 are bevel gears 116 which mesh with bevel gears 117 fixed on the shafts 65. Fixed on the upper journals 114 are gears 118 which mesh with corresponding gears 119 fixed upon the upper journals 110. By this means when the shafts 65 are rotated the inner snapping rolls will be rotated and these inner snapping rolls will in turn cause the rotation of the outer snapping rolls, it being understood that the inner and outer rolls revolve in opposite directions so that as the stalks pass between such rolls the ears will be snapped off of these stalks.

The forward ends of the members 34 are prolonged divergently as at 119' and are held in divergent position by the braces 120 which connect the forward ends of said divergent portions 119' with the straight portions 34 intermediate the ends of the latter. Moreover, the members 119' and 120 are held spaced at their rear ends by means of braces 121. Fixed on each of the lower journals 110 is a sprocket wheel 122 which is connected by means of a chain 123 to a sprocket 124 carried on a shaft 125 journaled in a suitable bearing bracket 126 supported from a respective member 34. Fixed on the shaft 125 is a second sprocket wheel 127 which is connected by a chain 128 with a sprocket 129 fixed on a shaft 130 supported by a suitable bearing bracket 131 fixed to the respective member 34 adjacent its forward end. Fixed on the shaft 130 is a bevel gear 132 which meshes with a bevel gear 133 fixed to a crank shaft 134, the rear end of the shaft being journaled in the bracket 131 while the forward end of the shaft is supported by a suitable bearing bracket 135 mounted on the respective member 119'. On the forward end of each of the crank shafts 134 is a bevel gear 136 which meshes with a bevel gear 137 fixed on a shaft 138 extending transversely of the members 119' and 120 and journaled in a suitable bearing box 139. On each of these shafts 138 is mounted one of the members 86. By means of this arrangement there is one of these members 86 disposed centrally of the machine while the other two members 86 are disposed one on each side thereof at the forward ends of the projecting part of the machine. Extending forwardly and downwardly from the upper end of each of the members 105 is an upper outside frame member 140 which is connected at its forward end to the forward ends of the respective members 119' and 120. These members 140 are also connected to the members 103 by way of bracing both members and each of the members 140 pivotally supports certain of the levers 93 which in turn support certain of the finger bars 96, the lower ends of these finger bars being connected by the boxes 97 to the crank shafts 134.

Each of the chains 128 is provided with a projecting series of guide blades 141 so that as the corn harvester moves forwardly the corn stalks will be received between the pairs of diverging members 73 and 119' and fed between the snapping rolls just prior to reaching which they will be guided on the blades 141.

At 142 is a cross bar which connects the members 91 adjacent their ends and connecting the inner ends of the members 12 to this cross bar 142 are frame members 144 which carry bearings 145 alined with similar bearings 146 on the member 142. Supported in the bearings 145 and 146 is a shaft 147 whereon is mounted a pair of sprocket wheels 148 which are connected by chains 149 with sprocket wheels 150 mounted on the respective shaft 70. Moreover, these chains 149 support the conveyer or elevator flights 151. Beneath the lower end of each of these conveyers or elevators is a hopper 152 wherein the unhusked ears of corn drop after being snapped off by the snapping rolls, these unhusked ears being prevented from flying outward by means of the baffle boards 153.

Mounted on the rear frame member 10 are bearings 154 which are alined with similar bearings 155 mounted on the member 142. These bearings 154 and 155 receive the journals 156 of the husking rolls indicated in general at 157. These husking rolls are arranged in two pairs and on the rear journal of each of the outer husking rolls is fixed a sprocket wheel 157' which is connected by means of a chain 158 with a sprocket wheel 159 mounted on a respective shaft 65. The forward journals of these husking rolls each carry a gear 160, these gears meshing so that as the outer rolls are driven by the action of the sprocket chain 158 the inner rolls will be likewise driven in the opposite direction by the action of the gears 160.

It is to be observed that the vertical conveyer is located at the forward end of each pair of rolls and delivers the unhusked ears to such pair of rolls.

Each of these husking rolls 157 consists of a cylindrical body whereon is mounted a series of longitudinally extending blades 161 each having one edge sharp as at 162 and the other edge rounded as shown at 163, the sharp edges 162 overlying the rounded portions 163. These blades extend straight along the rolls 157 and are secured by means of suitable countersunk bolts 164.

The frame members 34 are continued rearwardly as at 165 and on the rear ends of these extensions 165 is carried a conveyer frame member 166. On the members 10 and 166 are alined bearings 167 wherein is journaled a shaft 168 carrying a sprocket wheel 169. Secured to the members 166 and 10 and extending upwardly and laterally of the machine are conveyer sides 170 and on the outer ends of these sides are mounted the bearings 171 which carry a shaft 172 having mounted thereon the sprockets 173. The sprockets 169 are connected to the sprockets 173 by means of chains 174 and in order to hold the receiving part of the conveyer level, the chains 174 are led under sprockets 175 mounted on stub shafts 176 journaled in bearings 177 mounted on the members 10 and 166. These chains 174 carry a conveyer belt 178 provided with the usual flights 179. In order to drive this conveyer there is provided on the rear end of one of the shafts 65 a gear 180 which meshes with a similar gear 181 on the shaft 168.

Extending upward from the rear end of each of the frame members 34 is a vertical frame member 182 the upper end of which is connected to the upper end of a respective vertical frame member 106 by means of a diagonal frame member 183. Supported by the members 34, 182, 183, and 106 is a guide or baffle plate 184 which prevents the corn from jumping outward off of the rollers 157 when being husked, similar baffle plates being provided between the sets of husking rolls. Moreover, the entire device is preferably provided with light sheet metal housings to protect the working parts but it has been found advisable, in order to disclose such working parts, to omit this housing in most of the views of the drawings.

In order to operate the lever 57 from the driver's seat 50, the upper end of this lever is provided with a rock arm 185 to the outer end of which is connected a pull rod 186 terminating adjacent the seat 50.

In order to support the outer end of the conveyer, the two side members of the conveyer are connected by a bar 187 which is in turn connected to the upper end of one of the members 182 by a link 188.

The members 35 and 39 are also braced against vertical movement with respect to the frame by means of suitable braces indicated at 189. In the operation of the device the machine is driven through the field of corn in such manner that one row is received between each pair of the diverging members 73 and 119'. Any stalks that may have fallen are picked up by the members 86 and as the machine passes along these stalks will pass to the rear or throats of the diverging members, being kept upright and having their leaves combed upwardly by the action of the members 96 constituting the finger bars. As the upstanding stalks pass through the throats at the rear of the diverging members the fingers 141 will carry the stalks into the rolls 109 and 115. As they pass through these snapping rolls the ears of corn with the husks on will fall into the hoppers 152 and be picked up by the vertical conveyers and deposited on the husking rolls 157. As the ears pass down these husking rolls 157 they will have the husks stripped therefrom by the action of the blades on such rolls and will drop off the rear end of these rolls onto the conveyer 178 being carried along and up by this conveyer to drop off the end thereof into a cart or other suitable receptacle.

It will be obvious that when moving the machine from one place to another the clutch members 52 and 55 are disconnected. It will also be obvious that the machine may be set at any desired height from the ground so that the stalks will be cut at such height and furthermore that the machine may be tilted at its forward end either upwardly or downwardly so that the members 86 will work just clear of the ground and will not strike the ground and be injured thereby.

It is to be noted that after the stalks pass between the snapping rolls they will fall between the frame members 11 and 34, the outside upper frame members acting to guide them into this position so that when the machine passes along they will be left in two clean rows all extending in the same direction.

Thus by means of this apparatus the corn is harvested, the ears separated from the stalks, the stalks laid in neat rows, and the ears finally conveyed to a cart so that they may be taken to a barn or other place for storage.

There has thus been provided a highly efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

1. In a corn harvester, mechanical stalk lifters at the front of the harvester, mechanical combs arranged for vertical oscillatory movement to the rear of the lifters, and vertical snapping rolls to the rear of the combs.

2. In a corn harvester, mechanical stalk lifters at the front of the harvester, mechanical combs to the rear of the lifters, vertical snapping rolls spaced to the rear of the combs, a vertical ear elevator between the combs and rolls fingers in advance of the snapping rolls for carrying the stalks to the rolls and rearwardly and downwardly extending husking rolls.

3. In a harvesting machine of the character described, a frame having forwardly diverging members, rearwardly inclined spaced pairs of husking rolls journaled in the frame, upwardly convergent flight conveyers on said frame arranged at the outer sides of said husking rolls adjacent the front end of said frame, horizontally movable stalk feeders arranged spaced from the lower ends of said flight conveyers, vertically disposed pairs of snapping rolls mounted on the frame rearwardly of the flight conveyers and said stalk feeders, and resiliently yieldable pick-up wheels horizontally journaled at the extreme forward ends of said divergent members.

4. In a harvesting machine of the character described, a frame having forwardly diverging members, rearwardly inclined spaced pairs of husking rolls journaled in the frame, upwardly convergent flight conveyers on said frame arranged at the outer sides of said husking rolls adjacent the front end of said frame, horizontally movable stalk feeders arranged spaced from the lower ends of said flight conveyers, vertically disposed pairs of snapping rolls mounted on the frame rearwardly of the flight conveyers and said stalk feeders, resiliently yieldable pick-up wheels horizontally journaled at the extreme forward ends of said divergent members, and opposed vertically oscillating stalk lifters at intervals along the divergent members.

5. In a harvesting machine of the character described, a frame having forwardly diverging members, rearwardly inclined spaced pairs of husking rolls journaled in the frame, upwardly convergent flight conveyers on said frame arranged at the outer sides of said husking rolls adjacent the front end of said frame, horizontally movable stalk feeders arranged spaced from the lower ends of said flight conveyers, vertically disposed pairs of snapping rolls mounted on the frame rearwardly of the flight conveyers and said stalk feeders, resiliently yieldable pick-up wheels horizontally journaled at the extreme forward ends of said divergent members, opposed vertically oscillating stalk lifters at intervals along the divergent members, and crank shafts for actuating said lifters.

6. In a harvesting machine of the character described, a frame having forwardly diverging members, rearwardly inclined spaced pairs of husking rolls journaled in the frame, upwardly convergent flight conveyers on said frame arranged at the outer sides of said husking rolls adjacent the front end of said frame, horizontally movable stalk feeders arranged spaced from the lower ends of said flight conveyers, vertically disposed pairs of snapping rolls mounted on the frame rearwardly of the flight conveyers and said stalk feeders, resiliently yieldable pick-up wheels horizontally journaled at the extreme forward ends of said divergent members, opposed vertically oscillating stalk lifters at intervals along the divergent members, crank shafts for actuating said lifters, and resiliently held foldable fingers included with said lifters.

7. In a harvesting machine of the character described, a frame having forwardly diverging members, rearwardly inclined spaced pairs of husking rolls journaled in the frame, upwardly convergent flight conveyers on said frame arranged at the outer sides of said husking rolls adjacent the front end of said frame, horizontally movable stalk feeders arranged spaced from the lower ends of said flight conveyers, vertically disposed pairs of snapping rolls mounted on the frame rearwardly of the flight conveyers and said stalk feeders, resiliently yieldable pick-up wheels horizontally journaled at the extreme forward ends of said divergent members, opposed vertically oscillating stalk lifters at intervals along the divergent members, crank shafts for actuating said lifters, resiliently held foldable fingers included with said lifters, and baffle boards arranged above the feeders and spaced outwardly from said conveyers.

8. In a harvesting machine of the character described, a frame having forwardly diverging members, rearwardly inclined spaced pairs of husking rolls journaled in the frame, upwardly convergent flight conveyers on said frame arranged at the outer sides of said husking rolls adjacent the front end of said frame, horizontally movable stalk feeders arranged spaced from the lower ends of said flight conveyers, vertically disposed pairs of snapping rolls mounted on the frame rearwardly of the flight conveyers and said stalk feeders, resiliently yieldable pick-up wheels horizontally journaled at the extreme forward ends of said divergent members, opposed vertically oscillating stalk lifters at intervals along the divergent members, crank shafts for actuating said lifters, resiliently held foldable fingers included with said lifters, baffle boards arranged above the feeders and spaced outwardly from said conveyers, and mechanism for synchronously operating the lifters, flight conveyers, feeders, and snapping and husking rolls.

9. In a harvesting machine of the character described, a frame having forwardly diverging members, rearwardly inclined spaced pairs of husking rolls journaled in the frame, upwardly convergent flight conveyers on said frame arranged at the outer sides of said husking rolls adjacent the front end of said frame, horizontally movable stalk feeders arranged spaced from the lower ends of said flight conveyers, vertically disposed pairs of snapping rolls mounted on the frame rearwardly of the flight conveyers and said stalk feeders, resiliently yieldable pick-up wheels horizontally journaled at the extreme forward ends of said divergent members, opposed vertically oscillating stalk lifters at intervals along the lifters, resiliently held foldable fingers included with said lifters, baffle boards arranged above the feeders and spaced outwardly from said conveyers, mechanism for synchronously operating the lifters, flight conveyers, feeders, snapping and husking rolls, and driven connections between the crank shaft and the pick-up wheels.

In testimony whereof, I affix my signature, in the presence of two witnesses.

RAYMOND GALBRAITH.

Witnesses:
 WALTER FLOOD,
 LOUIS CURTIS.